United States Patent [19]

Wilstermann

[11] Patent Number: 4,906,044
[45] Date of Patent: Mar. 6, 1990

[54] LOCKING DEVICE FOR ARM REST STORAGE COMPARTMENT

[75] Inventor: William D. Wilstermann, Utica, Mich.

[73] Assignee: General Motors Corporation, Detroit, Mich.

[21] Appl. No.: 293,910

[22] Filed: Jan. 6, 1989

[51] Int. Cl.⁴ .............................................. A47C 7/62
[52] U.S. Cl. .................... 297/194; 292/252; 297/113; 312/235.6
[58] Field of Search ............ 297/113, 194, 417; 312/235 A; 292/252, 210, 153, 108

[56] References Cited

U.S. PATENT DOCUMENTS 3,951,448  4/1976  Hawie ........................... 297/113
4,094,392  6/1978  Gregg et al. ..................... 292/153 X
4,652,029  3/1987  Yamamoto ...................... 292/252
4,714,286 12/1987  Yamamoto ...................... 292/252 X Primary Examiner—James T. McCall
Attorney, Agent, or Firm—Charles E. Leahy

[57] ABSTRACT

A vehicle arm rest includes a base pivotally mounted on the vehicle seat or console. The base has a storage compartment therein. A cover is hingedly mounted on the base to open and close the storage compartment. A latch acts between the base and cover to latch the cover in the closed position. The arm rest is movable between a horizontal arm rest position and a vertical stored position. A blocking device is associated with the latch and is effective to block the latch from movement to the unlatched position when the arm rest is in the vertical stored position and unblocks the latch for unlatching movement when the arm rest is in the horizontal position to enable access to the storage compartment.

3 Claims, 3 Drawing Sheets

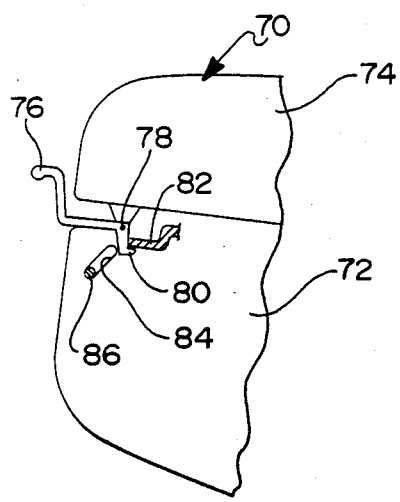
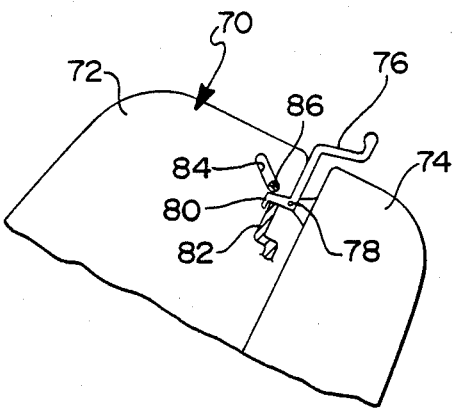
FIG 4
FIG 5
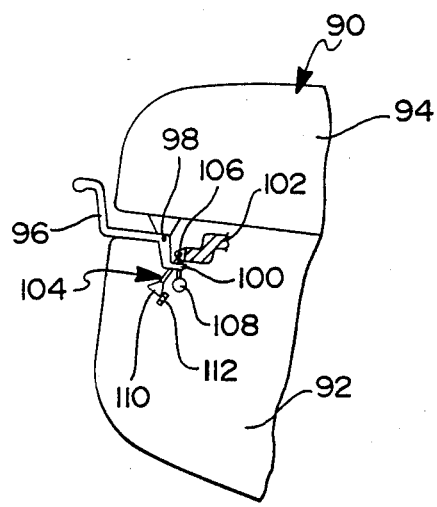
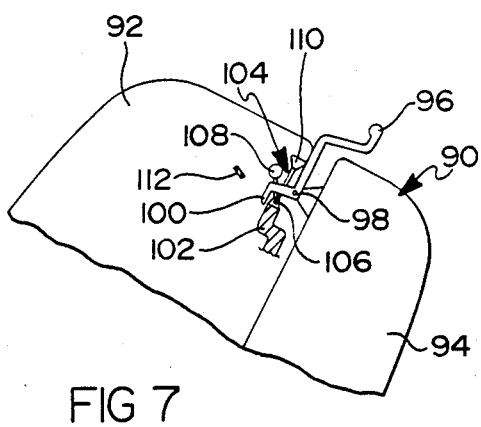
FIG 6
FIG 7

LOCKING DEVICE FOR ARM REST STORAGE COMPARTMENT

FIELD OF THE INVENTION

The invention relates to a vehicle arm rest having a storage compartment therein and more particularly to an arm rest cover having a latch which cannot be unlatched when the arm rest is in a vertical stored position.

BACKGROUND OF THE INVENTION

It is well known in vehicle seats to provide an arm rest which is pivoted on the seat for movement between a generally horizontal arm rest forming position and a generally vertical stored position flush with the vehicle seat back.

It is also known in vehicle arm rests to provide a two-piece arm rest comprised of a base having a storage compartment therein and a cover hinged to the base for movement between open and closed positions to close the storage compartment and open the storage compartment.

A latch is provided to latch the cover in the closed position and is actuable to unlatch the cover for movement to the open position permitting access to the storage compartment.

It would be desirable in such arm rests having storage containers to provide a latch which could be unlatched when the arm rest is in the horizontal position but could not be unlatched when the arm rest is in the vertical stored position.

SUMMARY OF THE INVENTION

A vehicle arm rest includes a base pivotally mounted on the vehicle seat or console. The base has a storage compartment therein. A cover is hingedly mounted on the base to open and close the storage compartment. A latch acts between the base and cover to latch the cover in the closed position. The arm rest is movable between a horizontal arm rest position and a vertical stored position. A blocking device is associated with the latch and is effective to block the latch from movement to the unlatched position when the arm rest is in the vertical stored position and unblocks the latch for unlatching movement when the arm rest is in the horizontal position to enable access to the storage compartment.

Accordingly, the object feature and advantage of the invention resides in the provision of an arm rest having a storage compartment in which the latch associated with the cover for the storage compartment is position responsive to prevent opening of the cover when the arm rest is in the vertical stored position.

DESCRIPTION OF THE PREFERRED EMBODIMENT

These and other features, objects and advantages of the invention will become apparent upon consideration of the description of the preferred embodiment and the appended drawings in which.

FIGS. 4 and 5 schematically represent the blocking device respectively in the horizontal position and the vertical position of the arm rest; and FIGS. 6 and 7 schematically represent a second embodiment of the invention shown respectively in the horizontal and vertical positions.

DESCRIPTION OF THE PREFERRED EMBODIMENT

Figure 1:
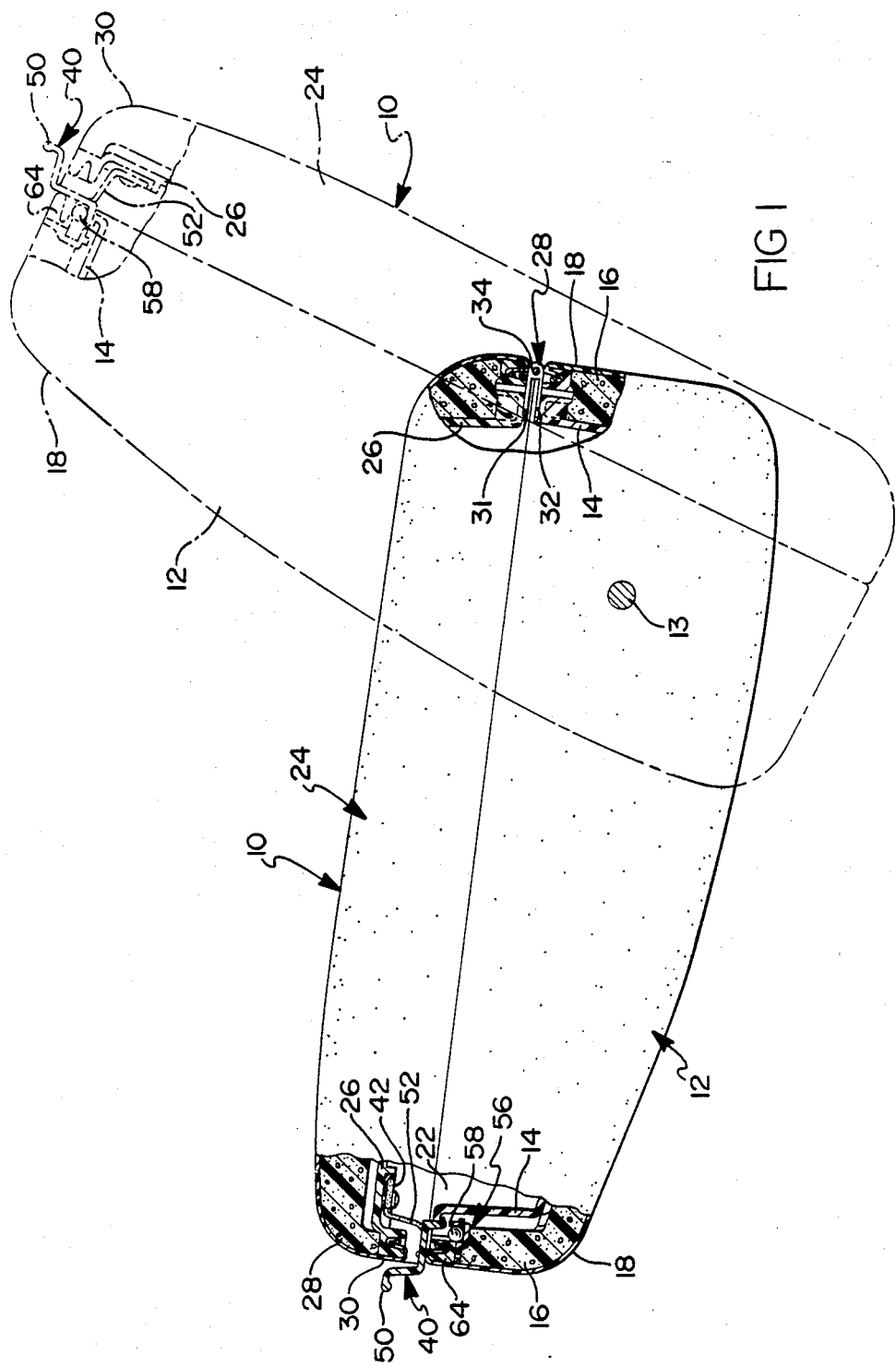
FIG. 1 shows the arm rest of this invention in the normal horizontal arm rest forming position and also shows the vertical stored position in phantom line.

Referring to FIG. 1, a vehicle arm rest generally indicated at 10 includes a base 12 which is mounted on a pivot 13. The base 12 is comprised of a rigid molded plastic housing 14 covered with a form cushion 16 and a vinyl cover 18. The housing 14 defines a storage compartment 22 for receiving maps, gloves or other articles.

The arm rest 10 also includes a cover 24 which is comprised of a molded plastic housing 26 covered by a foam cushion 28 and a vinyl cover 30. The cover 24 is pivotally mounted on the base 12 by a hinge 28. The hinge 28 includes a hinge leaf 31 which is attached to the housing 26 of the cover 24 and a hinge leaf 32 which is attached to the housing 14 of the arm rest base 12. The hinge leaves 31 and 32 are pivotally joined together by a pivot pin 34. Accordingly, the arm rest cover 24 is hingedly mounted relative to base 12 to permit opening and closing movement of the cover 24 relative to the storage compartment 22 defined by the base 12.

As best seen in FIG. 1, it will be appreciated that the arm rest 10 is pivotable about the pivot 13 between the horizontal arm rest forming position indicated in the solid lines of FIG. 1, and the vertical stored position flush with the seat back as shown in phantom lines.

Figure 2:
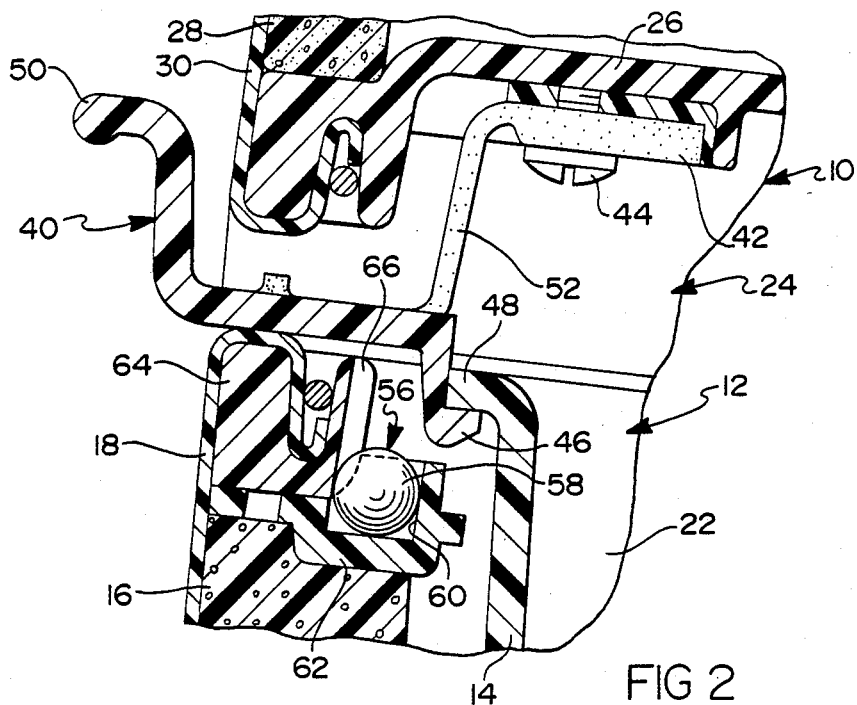
FIG. 2 is an enlarged fragmentary view of FIG. 1 showing the blocking device for the latch in an unblocking position permitting normal actuation of the latch to open the cover when the arm rest is in the horizontal position.

A latch generally indicated at 40, is provided to latch the cover 24 in the closed position with respect to the base 12 as best seen in FIG. 2, the latch 40 is a molded plastic member having a base 42 which is attached to the housing 26 of cover 24 by a screw 44. The latch 40 also includes a latch hook 46 which hooks over a flange 48 of the housing 14 of base 12. In addition, the latch 40 has a hand grip 50. As best seen in FIG. 2, the vehicle occupant may lift the hand grip 50 to pivot the latch 40 as permitted by yielding of a yieldable portion 52 thereof to carry the latch hook 46 away from the flange 48 of base 14. Accordingly, the cover 24 may be lifted away from the base 12 to enable access to the storage compartment 22.

It will be appreciated that the cover 24 will most often be unlatched when the arm rest 10 is in the horizontal position of FIG. 1. However, should the latch 40 be unlatched when the arm rest is in the phantom line indicated vertical position of FIG. 1, the articles stored in the compartment 22 may fall from the storage compartment 22. Accordingly, the present invention provides a blocking device which prevents the latch 40 from being unlatched when the arm rest is in the vertical position.

Figure 3:
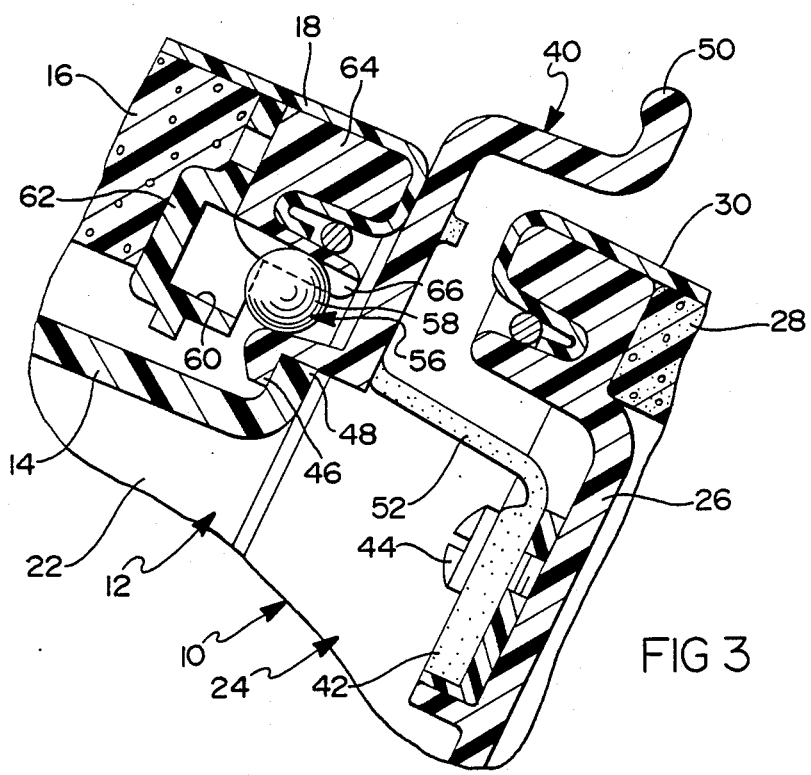
FIG. 3 is an enlarged fragmentary view of FIG. 2 showing the blocking device blocking the latch to prevent the opening of the cover when the arm rest is in the vertical stored position.

As best seen in FIGS. 2 and 3, the blocking device generally indicated at 56 is comprised of a ball 58 which is seated in a receptacle 60 formed in a molded plastic housing 62 suitably fastened to the housing 14 in a manner not shown. The receptacle 60 has an open top. A guide block 64 is suitably attached to the housing 62 and defines a guide channel 66 which guides the movement of the ball 58 when the ball 58 rolls out of the open top receptacle 60 upon pivotal movement of the arm rest 10 to the vertical position as shown in FIG. 3.

Referring to FIG. 3, it is seen that the pivotal movement of the arm rest 10 to the vertical position causes the ball 58 to be induced by gravity to roll out of the open top receptacle 60 as guided by the guide channel 66 and into engagement with the latch hook 46 of the latch lever 40. Accordingly, should the latch lever 40 be gripped and pivotally rotated in the unlatching direction, the ball 58 wedged between the guide channel 66 and the latch hook 46 will prevent the pivotal movement of the latch lever 40 and thereby prevent the latch hook 46 from disengaging from the flange 48 of the base housing 14. Thus, the latch 40 cannot be disengaged when the arm rest is in the vertical position so that the articles stored in the storage compartment will not be spilled out of the arm rest.

When the arm rest is pivoted from the stored position of FIG. 3 down to the horizontal position of FIG. 2, gravity induces the ball 58 to fall into the open top receptacle 60 and thereby unblock the latch 40 for pivotal movement to the unlatched position.

FIGS. 4 and 5 show a schematic simplification of the embodiment of the invention shown in FIGS. 1 through 3. Arm rest 70 includes base 72 and a cover 74 which is pivoted to the base 72. A latch lever 76 is pivoted to the cover 74 by a pivot pin 78. The latch lever 76 includes a hook 80 which engages with a housing portion 82 of the arm rest base 72. A guide channel 84 is defined in..the base 72 and seats a blocking element 86. Referring to FIGS. 5, it the blocking element 86 may be a piece of round rod or rectangular plate is seen that the pivotal movement of the arm rest 70 to the vertical stored position causes the blocking element 86 to be displaced by gravity along the guide channel 84 and into blocking engagement with the hook 80 so that the latch lever 76 cannot be rotated to the unlatched position disengaging from the base housing 82.

FIGS. 6 and 7 show a schematic representation of a second embodiment of the invention. The arm rest 90 includes base 92 and cover 94 which are hinged together. A latch lever 96 is pivoted on the cover 94 by a pivot pin 98. The latch lever 96 has a hook portion 100 which engages with a housing 102 of the base 92. The blocking member, generally indicated at 104, is pivotally mounted on the base housing 102 by pivot 106 and includes a blocking element 108 and a counterweight 110. The counterweight 110 engages with a stop 112 as shown in FIG. 6 to position the blocking element 108 at a location permitting free rotation of the latch lever 96 into and away from engagement with the base housing 102.

However, as shown in FIG. 7, pivotal movement of the arm rest 90 to the stored position causes the counterweight 110 to have rotated the blocking element 108 into a blocking position with respect to the hook portion 100 of latch lever 96 so that the latch lever 96 cannot be pivoted relative to the base 92 to unlatch the cover 94.

Thus it is seen that the invention provides a new and improved latch for an arm rest cover which is responsive to the position of the arm rest to block the latch and prevent opening of the storage compartment to prevent the spilling of the contents onto the vehicle floor.

It will be understood that the latch mechanism may have a push-button-type latch as opposed to the pivotal latch lever shown in the drawings. Furthermore, it will be understood that such a push-button latch or the latch lever shown herein may be mounted on either the arm rest or the cover. In either case, the use of a blocking device prevents the latch from being unlatched when the arm rest is in the vertical stored position.

The embodiments of the invention in which an exclusive property or privilege is claimed are defined as follows:

1. A vehicle seat arm rest comprising:
   a base member having an open storage compartment therein;
   pivot means mounting the base member on the vehicle seat for movement between a horizontal rest position and a vertical stored position;
   a cover member for closing the open storage compartment;
   hinge means mounted on one end of the base member and hingedly mounting one end of the cover member on the base member to permit selective pivotal movement of the cover member between a closed position closing the storage compartment and an opened position opening the storage compartment;
   a striker flange carried by one of the members on the end thereof opposite the one end;
   a latch lever pivotally mounted other member at the end thereof opposite the one end and engageable with the striker flange to latch the cover member and being selectively pivotable away from engagement with the striker flange to unlatch the cover member for movement to the open position;
   and blocking means movably mounted on the other member at the end opposite the one end and being directly engaged with the latch lever when the latch lever is engaged with the striker flange and the arm rest is located in the vertical stored position so that the latch lever cannot be pivotally moved to disengage from the striker flange, and said blocking means being moved away from direct engagement with the latch lever when the arm rest is moved to the horizontal stored position so that the latch lever is unblocked for selective pivotal movement out of latching engagement with the striker flange to permit the latch lever to be pivoted and disengaged from the striker flange to permit opening of the cover member to open the storage compartment.

2. The vehicle seat arm rest of claim 1 further characterized by the blocking means being a blocking mass movably mounted in a guiding receptacle carried by the base and being moveable from the guiding receptacle into direct engagement with the latch lever when the arm rest is moved to the vertical position.

3. The vehicle seat arm rest of claim 1 further characterized by the blocking means being a blocking lever pivotally mounted on the base and moveable between a first position directly engaging the latch lever to block the pivotal movement of the latch lever to the unlatched position when the arm rest is in the vertical position and a second position unblocking the latch lever to enable actuation of the latch lever to unlatch the cover when the arm rest is in the horizontal arm rest position.

* * * * *